United States Patent [19]

Krekelberg

[11] Patent Number: 4,827,876
[45] Date of Patent: * May 9, 1989

[54] DOG LEASH ATTACHMENT

[76] Inventor: George Krekelberg, P.O. Box 2191, National City, Calif. 92050

[*] Notice: The portion of the term of this patent subsequent to Aug. 9, 2003 has been disclaimed.

[21] Appl. No.: 532,284

[22] Filed: Sep. 15, 1983

[51] Int. Cl.<sup>4</sup> ........................ A01K 3/00; A01K 27/00
[52] U.S. Cl. ..................................... 119/109; 119/120
[58] Field of Search ....................... 119/96, 109, 120; 269/249

[56] References Cited

U.S. PATENT DOCUMENTS

| | | | |
|---|---|---|---|
| 676,303 | 6/1901 | Cramer | 269/249 X |
| 1,233,223 | 7/1917 | Hachmann | 269/249 |
| 2,245,089 | 6/1941 | Hargrave | 269/249 |
| 2,861,547 | 11/1958 | Dale | 119/109 |
| 2,949,140 | 8/1960 | Larson | 269/249 |
| 4,252,084 | 2/1981 | Willow | 119/109 X |

FOREIGN PATENT DOCUMENTS 245930 1/1926 United Kingdom ................. 119/120

Primary Examiner—Hugh R. Chamblee
Attorney, Agent, or Firm—Charmasson & Holz

[57] ABSTRACT

An animal safety tether which provides several degrees of movement for the animal and simplified attachment and adjustment of the resulting confined boundaries.

In the preferred embodiment, clamps attach to opposite walls of a pickup truck, securing a belt and leash assembly. This restrains the animal, but allows radial, circular and transverse movements of the animal. Transverse motion is limited by adjustable clasps on the belt and radial motion is limited by an adjustable leash fastener. Attachment to the walls of the pickup truck is by means of clamps with apertures or hook eyes to accept the belt in several orientations. The shape of the clamp and orientation in several different directions allow attachment to a variety of pickup truck walls or similar surfaces.

1 Claim, 1 Drawing Sheet

DOG LEASH ATTACHMENT

FIELD OF THE INVENTION

This invention relates to animal husbandry, specifically animal restraints. The invention also relates to vehicles, specifically restraints for occupants.

BACKGROUND OF THE INVENTION

Vehicle animal restraints by means of leashes, straps, chains and harnesses anchored to the vehicle are well know. The purposes of the devices include: protecting the animal, protecting others from the animal and preventing escape. The devices generally allow some movement, typically within a circle defined by a radius equal to the length of the leash. By allowing movement, the animal can be more comfortable during travel, it can also exclude others from the area. Restraint may also be required by local leash laws. However, prior art does not provide simplified attachment or adjustment of the shape and size of the confined area.

Prior art animal restraints are generally attached to the vehicle one or three ways; (1) using existing tie down equipment on the vehicle, (2) providing a new anchor, or (3) adapting existing equipment to function as an anchor, such as door jamb inserts or seat cushion hooks or straps. However, existing tie down equipment may not be available or compatible, a new anchor requires a permanent hole or modification to the vehicle, and adapted equipment may be damaged or be incompatible.

SUMMARY OF THE INVENTION

The principal and secondary objects of the invention are: To provide an animal safety tether which restrains the animal within easily adjustable boundaries; to provide attachment hardware adaptable to a variety of vehicles or other applications; and to provide relatively unrestricted movement for the animal within the adjustable boundaries.

These and other objects are achieved by an animal safety tether which consists of a pair of clamps, a belt, and a leash. Clasps and fasteners provide adjustment, if required. The clamps provide an anchor for the belt and are configured so that attachment in several orientations are possible. The leash is slidably mounted to the belt allowing lateral motion of the leash. Lateral movement can be restrained by a pair of adjustable clasps attached to the belt. Leash length can be adjusted by a fastener. Leash is attached to the animal's collar.

DESCRIPTION OF THE PREFERRED EMBODIMENT OF THE INVENTION

Figure 1:
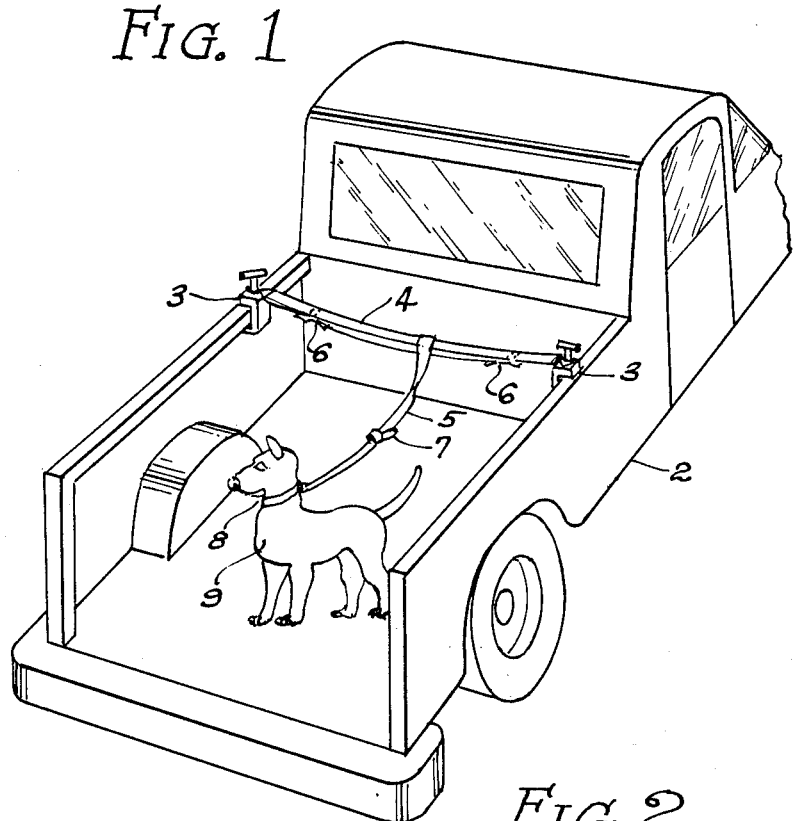
FIG. 1 is an overall perspective of the invention installed in the rear portion of a pickup truck, restraining a dog.
Figure 2:
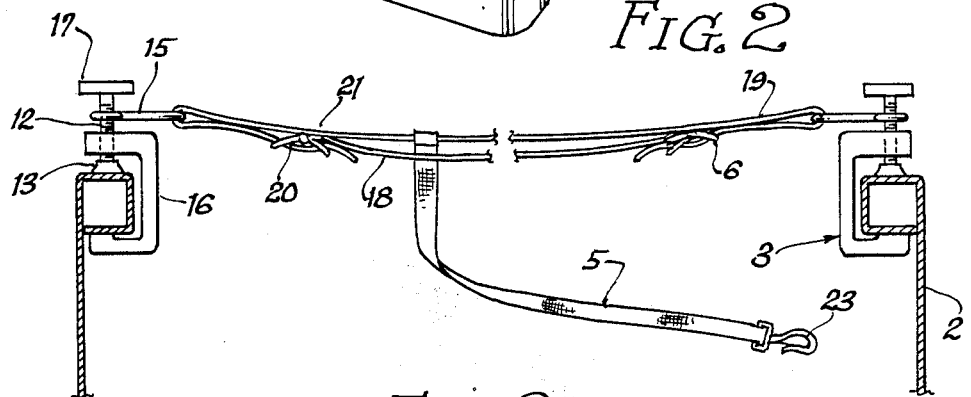
FIG. 2 is a view from the rear of a pickup truck illustrating one of the alternative forms of clamp attachment and an arrangement of the belt, clasps and leash.

The pickup truck 2, is shown in FIG. 2 as viewed from the rear. Clamps, 3, attach to the walls of the pickup truck, and anchor belt, 4, to stretch between the walls of the pickup truck. A loop shaped end of leash, 5, is placed over a section of the belt, allowing the leash to traverse the section of belt if leash is pulled towards one wall of the pickup truck. Lateral motion of leash, 5, is restrained by a pair of clasps, 6, mounted on the belt, 4. A fastener, 7, is mounted on the leash, 5, to provide adjustment of the length. The other end of the leash, 5, is attached to the animal's collar, 8. The animal, 9, is free to move within the bounds defined by the length of the leash, 5, shortened by fastener, 7, and the section of belt, 4, between clasps, 6.

Figure 4:
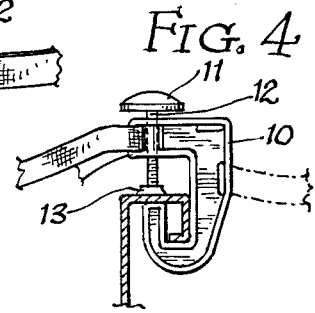

FIG. 4 illustrates one of the alternative clamp designs. A C-shaped structural member, 10, has one or more apertures to accept the belt, 4. Clamping is accomplished by tightening the knurled knob, 11, attached to threaded shaft, 12, until rotatably mounted land, 13, engages the pickup truck, 2. The land on the opposite end of the C-shaped structural member, 10, forms the other clamping surface.

Figure 5:
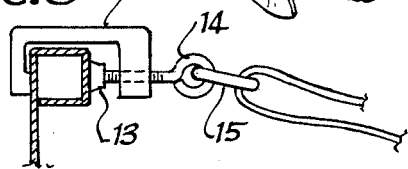
FIGS. 4 and 5 illustrate alternate forms of clamp and belt attachment.

FIG. 5 illustrates an alternative clamp design. The knurled knob, 11, and threaded shaft, 12, are replaced with a threaded shaft incorporating a hook eye on one end. The apertures in the plain C-shaped structural member, 16, are no longer required since the belt, 4, is attached to the hook eye by means of a clip, 15.

FIG. 2 illustrates still another alternative clamp design. The knurled knob, 11, and apertures in the C-shaped structural member, 10, are replaced with a plain C-shaped structural member, 16, a clip, 15, and a T-handle, 17, attached to the threaded shaft, 12. The belt, 4, is attached to the clip, 15, which is rotatably mounted to the threaded shaft, 12.

Figure 3:
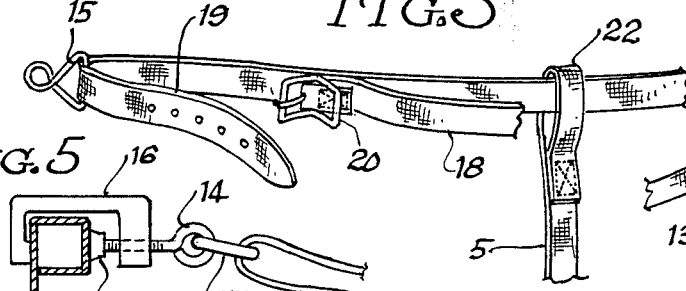
FIG. 3 is a detail of one form of adjustable clasp and belt.

FIGS. 2 and 3 illustrate one mode of belt, 4, construction. The belt is made up of two sections, a shoat section, 18, and a long section, 19. The long section, 19, is stretched between clamps, 3, and holes are provided on each end. The short section, 18, is attached to a clasp or buckle, 20 and sliding arch, 21, on each end. The buckles engage the holes; in the ends of the long section, 19, while the main portion of 19 is passed through the sliding arch, 21. The multiple holes in the ends of long section, 19, provide for an adjustable placement of clasps, 6.

Leash, 5, can also be used without a fastener, 7, as shown in FIG. 2. The leash, which may be a leather strap material or a chain, can also be used as a walking leash. The loop shaped end can be a hand grip, 22. Attachment to the animal or dog's collar, 8, is shown in FIG. 2 to be by means of a releasable hook, 23. The fastener, 7, may be a band clamp or S-shape hook.

Although this invention has been described in its preferred embodiments, it is clear that other embodiments and modifications can be devised by those skilled in the art without the exercise of inventive faculty and within the spirit of the invention as well as the scope of the appended claims.

What is claimed is:

1. An animal safety tether allowing two degrees of motion for an animal within the bounds of a vehicle, the tether comprising:
   a pair of clamps attached to the opposite sides of said vehicle for anchoring the animal safety tether;
   a belt attached to said clamps;
   a leash attached to said animal and slidably mounted on said belt;
   a pair of clasps attached to said belt which limit the sliding travel of said leash;

said clasps comprising a pair of belt buckles releasably attached to the ends of said belt looped through said clamps;

a means for securing said belt buckles to each other; and a sliding arch comprising a part of said belt between said clamps attached to each of said belt buckles.

* * * * *